United States Patent [19]

Herruzo

[11] 4,367,063
[45] Jan. 4, 1983

[54] PITCH CONTROL MECHANISM FOR COAXIAL HELICOPTER STEERING

[76] Inventor: Juan C. Herruzo, Nuñez de Balboa, 5, 2° A, Madrid, Spain

[21] Appl. No.: 241,387

[22] Filed: Mar. 6, 1981

[30] Foreign Application Priority Data

Apr. 18, 1980 [ES] Spain ................................. 490.715

[51] Int. Cl.³ ............................................. B64C 27/80
[52] U.S. Cl. ..................................... 416/115; 416/130
[58] Field of Search ................ 416/115, 130, 127, 129

[56] References Cited

U.S. PATENT DOCUMENTS

| | | | |
|---|---|---|---|
| 2,318,260 | 5/1943 | Sikorsky | 244/17 |
| 2,415,622 | 2/1947 | Bossi | 244/17 |
| 2,481,745 | 9/1949 | Hiller | 416/115 |
| 2,481,748 | 9/1949 | Hiller | 416/115 |
| 2,486,059 | 10/1949 | Pentecost | 416/115 |
| 2,540,543 | 2/1951 | Neville | 416/115 |
| 2,587,104 | 2/1952 | Breguet | 416/115 |
| 2,669,308 | 2/1954 | Thomson | 416/115 |
| 2,835,331 | 5/1958 | Ryan et al. | 416/130 X |
| 2,980,186 | 4/1961 | Strong et al. | 416/115 |
| 3,126,966 | 3/1964 | Agamian | 170/135.24 |
| 3,207,225 | 9/1965 | Shapiro | 416/115 |
| 3,409,249 | 11/1968 | Bergquist et al. | 416/130 X |
| 3,450,208 | 6/1969 | Barton | 416/130 X |
| 3,570,786 | 3/1971 | Lewis | 416/130 X |
| 3,592,559 | 7/1971 | Ward | 416/130 X |
| 3,669,564 | 6/1972 | Garfinkle | 416/121 |
| 3,735,945 | 5/1973 | Huvers | 244/17.19 |
| 3,814,351 | 6/1974 | Bielawa | 244/17.19 |
| 4,123,018 | 10/1978 | Montaigu | 416/130 X |
| 4,170,437 | 10/1979 | Korsak | 416/130 |

FOREIGN PATENT DOCUMENTS

| | | | |
|---|---|---|---|
| 196710 | 3/1958 | Austria | 416/115 |
| 749113 | 11/1944 | Fed. Rep. of Germany | 416/127 |
| 936071 | 7/1948 | France | 416/130 |
| 617290 | 2/1949 | United Kingdom | 416/130 |
| 618475 | 2/1949 | United Kingdom | 416/115 |

Primary Examiner—Everette A. Powell, Jr.
Attorney, Agent, or Firm—Costas S. Krikelis

[57] ABSTRACT

A directional and yaw control mechanism for coaxial helicopters, comprising a three coaxial ring system interconnected through a cam and link assembly for transmitting control signals from a steering station to change the rotor blade pitch either collectively to provide lift or independently in opposing directions to control yaw. Cyclic pitch control is also similarly provided.

7 Claims, 5 Drawing Figures

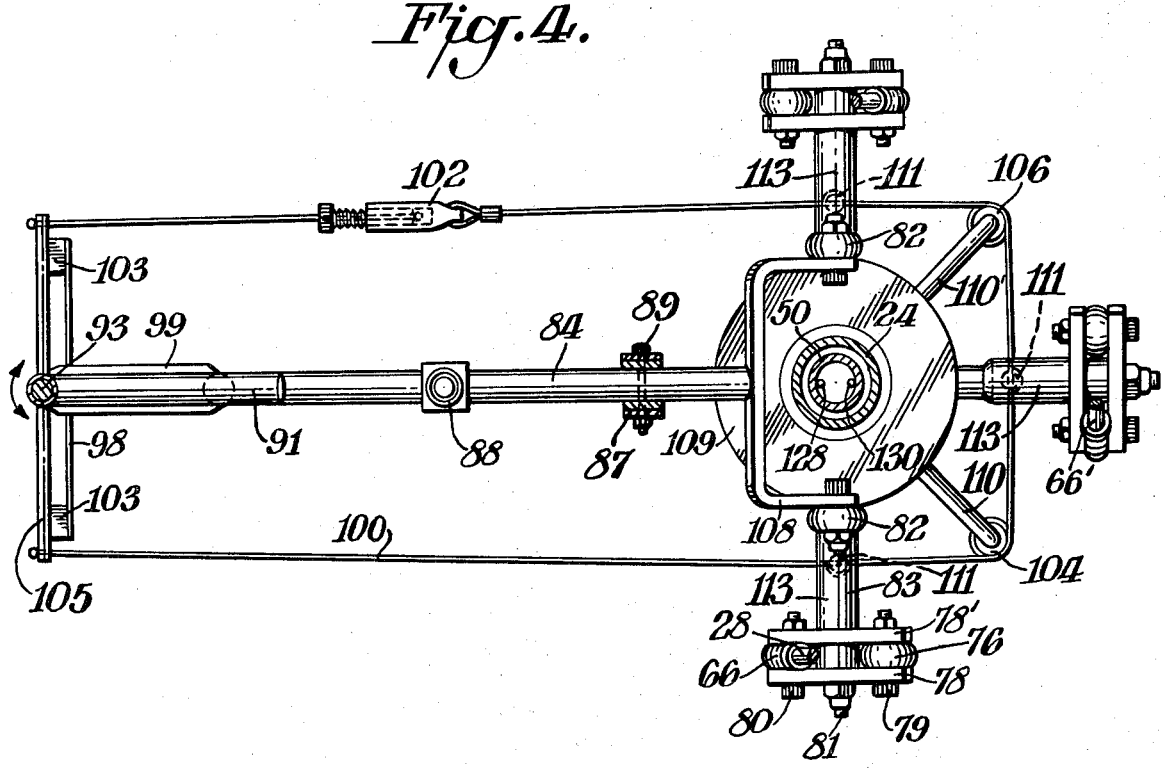
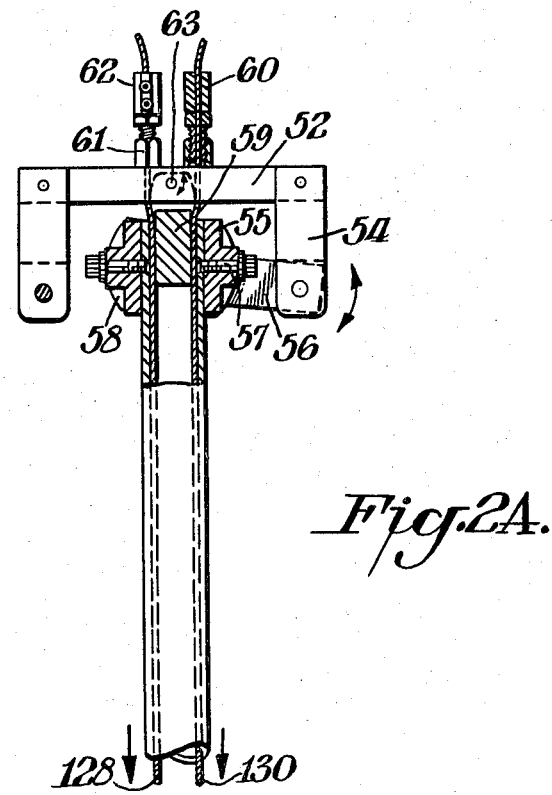

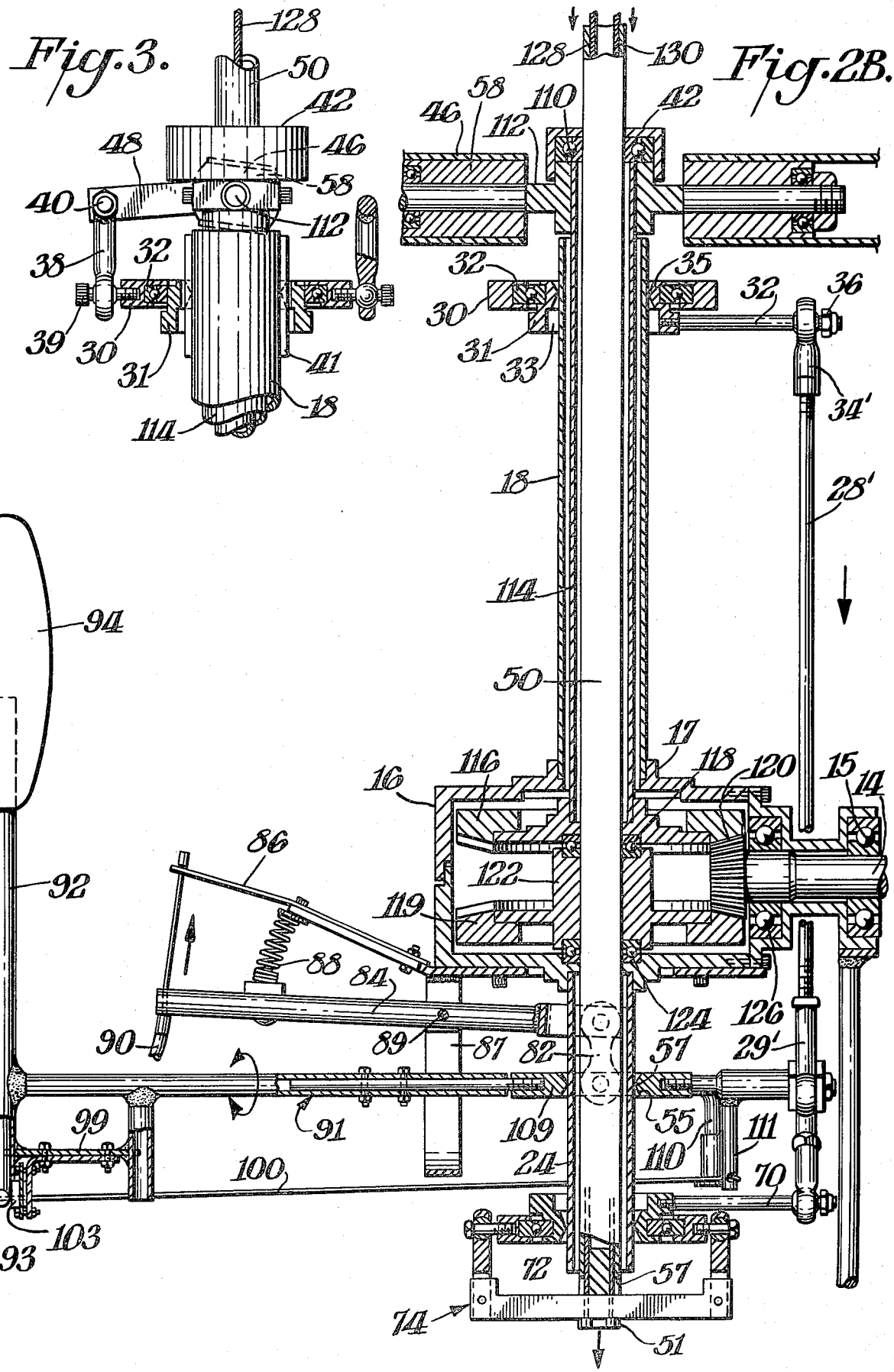

PITCH CONTROL MECHANISM FOR COAXIAL HELICOPTER STEERING

This invention relates to a steering mechanism for coaxial helicopters and more particularly to a mechanism for varying the pitch of a coaxial helicopter's blades either collectively to provide lift or simultaneously in opposing directions to control yaw.

Unlike airplanes which are supported in flight by fixed wings, helicopters become and are maintained airborne through the use of a supporting rotor with its rotating blades normally located above the cabin containing the engine and payload. Once the helicopter becomes airborne, some method must be available to prevent the cabin from gyrating in a direction opposite to that of the rotating blades above and provide a fixed platform. The traditional solution is the well-known helicopter tail rotor, whereby a fuselage is attached to the main cabin at the end of which there is usually located a tail rotor whose plane of rotation is generally perpendicular to that of the plane of rotation of the supporting rotor. This tail rotor generates a counter rotation force which nullifies the rotation force produced on the cabin because of the supporting rotor. By varying the effectiveness of that counter rotation force as for example by varying the pitch of the tail rotor blades, the helicopter cabin is stabilized and may be steered in one or another direction. This rotation of the helicopter cabin is referred to as yaw, and means to prevent it and use it for steering are also known as yaw control and steering means.

In addition to yaw, a helicopter in flight has two more degrees of freedom of motion relative to a stable axis; its forward end can be lowered or raised relative to a horizontal plane, and this motion is known as pitch, while it can also take a right or left inclination with respect to the same plane, known as roll.

The traditional yaw and steering control system described above, while well-known and reliable does involve an increased weight in the helicopter as well as the expenditure of energy and therefore additional engine power to rotate a blade whose sole function is yaw control and contributes nothing to lift. It is thus desirable to develop a means for yaw and steering control that eliminates the need for a tail rotor.

The development of the coaxial helicopter is a solution to this problem. In a coaxial helicopter, lift is generated through two cocentric but counterrotating rotors above the cabin. The rotors are balanced so that the countertorque of each exactly compensates the countertorque of the other and the rotating force transmitted to the cabin is zero, thus eliminating the yaw problem without the need for a tail rotor. To steer the helicopter, it has been proposed to provide controllable brakes at the tips of the rotor blades which operated from the cabin allow one to unbalance the countertorque of the two rotors and generate a controlled yaw which translates to a turning of the cabin in the desired direction. In the alternative, braking of one or the other rotors may be used to the same effect.

However, even this system wastes engine power, and is complicated to implement and control. What is needed is a system which will not rob the engine power to control yaw, but will use substantially all such power solely for maintaining the helicopter in flight and developing forward thrust.

The conventional controls of a helicopter, in addition to the throttle which controls the rotor revolution rate, include a lever for raising and lowering the helicopter in the vertical direction, a second lever similar to a "joy stick" for controlling pitch and roll, known as the cyclic pitch control and two foot controls which are used for yaw control or steering. A simpler system that would eliminate the foot pedals for steering would be desirable as it would somewhat simplify the skill required in flying a helicopter. Such system should also be less complicated minimizing the number of linkages and controls required to effect collective, yaw, and cyclic pitch control.

It is therefore the object of this invention to provide such a collective, yaw and cyclic pitch control for a helicopter having coaxial counterrotating variable pitch rotors, first and second concentric coaxial counterrotating torque transmitting means supported by a frame fixedly connected to said helicopter, first and second rotor means located one above the other, comprising at least two pivotably mounted blades, each said rotor means fixedly mounted on said counterrotating torque transmitting means whereby when said counterrotating torque transmitting means are rotated, said rotors counterrotate, and a control mechanism for changing the pitch of said rotor blades while said rotors rotate comprising: an enclosure surrounding said first and second torque transmitting means, a non-rotating main pitch control ring moveably mounted on said enclosure, upper and lower pitch control ring assemblies also mounted on said enclosure said upper and lower ring assemblies controlling the pitch of the first and second rotor blades respectively, at least two link means connecting the perimeter of said pitch control ring and the perimeter of said upper and lower ring assemblies, link means connected between said ring assemblies and said rotor blades, said main pitch control ring and pitch control ring assemblies mounted on said enclosure being free to move along the axis of said enclosure and to tilt in a plane crossing said axis.

Within the objective of this invention it is to provide a single lever control for performing both yaw controlling blade pitch changes as well as the cyclic pitch change, thus eliminating the need for foot pedal control by controlling the main pitch control ring through a steering lever comprising a steering tube fixedly connected to said main pitch control ring within which steering tube concentrically located there is a yaw control rod mounted rotatably along said steering tube, its axis of rotation being parallel to the axis of said steering tube.

The above objectives are obtained through a mechanism described below and better explained through the following figures.

FIG. 2A is a cross-section of the upper part of the elevation shown in FIG. 1

FIG. 2B is a cross-section of the lower part of the elevation shown in FIG. 1

FIG. 3 is a partial section, detailed view of the lower rotor mount and pitch control arrangement FIG. 4 is a top view along section 5—5 shown in FIG. 1.

Figure 1:
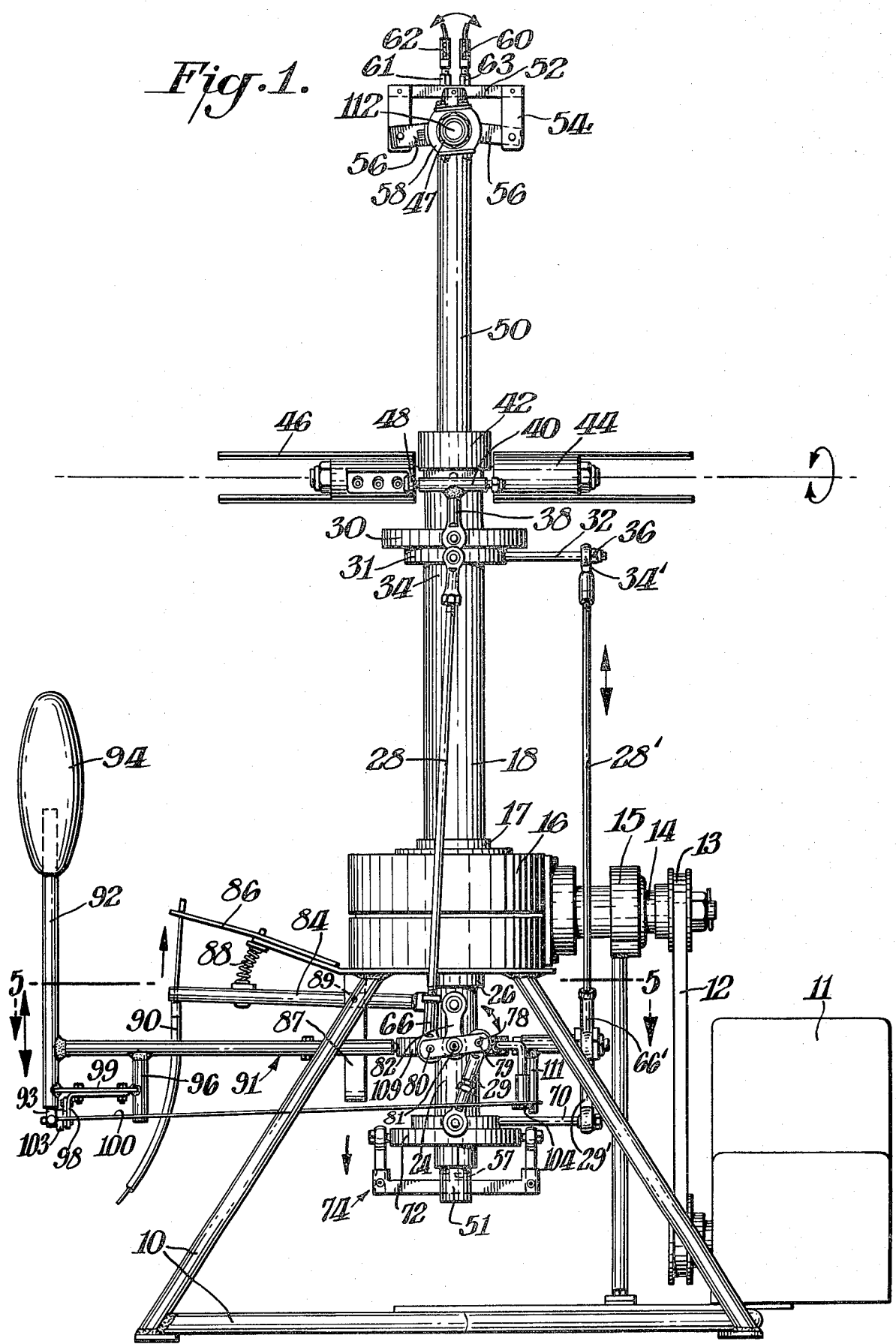
FIG. 1 shows an elevation of the coaxial rotor drive and pitch control arrangement

The preferred embodiment as shown in FIG. 1 comprises a frame 10 securely mounted onto the helicopter body which is not shown in this figure. A motor 11 also mounted on the helicopter transmits power to a shaft 14 through some conventional means, here depicted as a belt 12 and pulley 13 arrangement. Shaft 14 may further be supported on frame 10 through a bearing 15 better shown in FIG. 2B. Shaft 14 drives a differential ring and pinion gear arrangement housed in housing 16, through pinion 120 and ring gears 116 and 119. As seen in FIG. 2B pinion 120 drives ring gears 116 and 119 in opposite directions. A bearing 126 supports drive shaft 14 as it enters box 16.

Ring gear 116 drives torque transmitting hollow torque shaft 114 and ring gear 119 drives coaxial shaft 50. Bearings 118 and 124 serve to isolate the two shafts and permit them to counterrotate. Both shafts are protected by a cylindrical enclosure 18 supported in a socket 17 on top of the differential gear housing 16. On the bottom end of said housing 16 supported in a socket 26 a second cylindrical enclosure 24 protects and encloses the lower section of torque shaft 50 allowing only a small portion 51 to extend below the housing.

Below the housing 16 surrounding cylindrical enclosure 24 there is mounted a generally flat-shaped main pitch control ring 109 having interior beveled edges 55 which allow the ring to contact the enclosure along a circle 57 and permit it to be angled with respect to the enclosure to the extent of the beveled edge 55. In addition the contact between ring 109 and enclosure 24 is sufficiently loose to permit up or down displacement of the ring 109. FIG. 4 shows the support for ring 109 which is provided through articulated links 82 mounted at the tip of fork 108 which is supported below housing 16 by a hingedly mounted lever 84 on post 87 at hinge point 89. The lever 84, known as the collective pitch lever is spring mounted through spring 88 onto bracket 86 which is mounted on the housing 16. A sleeved cable 90 is connected to lever 84 and bracket 86.

Connected to ring 109 there is a rod 91 which terminates to a tube 92 at right angles to rod 91. Within tube 92 there is a rod 93 able to rotate by rotating handle 94 mounted thereon. At the bottom of rod 93 and at 90° to both rods 91 and 93 there is mounted a third rod 105. Pressing against rod 105 are two pads 103 connected at the end of leafspring 98. Leafspring 98 is supported with bracket 99 under rod 91 on a small stub 96.

As shown in FIG. 4 there are fixed to the rim of ring 109 at 120° and 270° respectively from the point of connection of rod 91 two angled tubular protrusions 110' and 110. Also mounted to the rim of ring 109 at points angularly displaced from the point of connection of rod 91 by 90° there are rotatably connected 3 short shafts 113 having appended thereto 3 short stubs 111. Stubs 96, 111 and angular protrusions 110 and 110' all point in a similar direction, below and away from housing 16 and at rest are generally parallel to cylindrical enclosure 24. A cable 100 fixed at both ends of the tips of rod 105, is fixedly attached to stubs 111 and strung over supports 104 and 106. A tensioning device 102 maintains cable 100 taut. At the end of each shaft 113 there is mounted a pivoting assembly comprising plates 78 and 78' and linking rods 28 and 29. An adjusting nut 66 allows lengthening or shortening rods 28 or 29, and provides a pivotable connection between linking rods 28 and 29 and plates 78 and 78' through carriage bolts 79 and 80. Plates 78 and 78' are fixedly attached to the end of shaft 113 through bolt 81.

On cylindrical enclosures 18 and 24 there are mounted an upper and lower pitch control ring assemblies. As the structure of the rings is substantially identical they shall be described with reference to the cross section of the upper ring shown in FIGS. 2B and 3.

Each ring assembly comprises two parts; an outer and an inner part connected by means of a bearing 32. The inner part 31 is fixed to the inner bearing sleeve and is fitted around enclosure 18 through a beveled edge part 35 which serves the same function as the beveled portion of main ring 109 described above. A spline 41 on enclosure 18 prevents this inner part 31 from rotating around enclosure 18 while permitting it to move axially or to tilt. Linking rod 28' through a length adjusting nut 34' is connected to a short bar 32 which in turn is attached to the lower end of part 31. There are three such bars 32 placed at 90° along the perimeter of part 31 and located substantially above the shafts 113 protruding from main ring 109.

On the outer sleeve of bearing 32, part 30 of the ring assembly, there is pivotably mounted along opposite ends through bolt 39 two link rods 38 each of which operates through an articulated connection 40 on a cam 48 fixedly connected to rotor blades 46. Blades 46 are pivotably mounted on hollow torque shaft 114 through supporting rod 112 and bearing 110 housed in casing 42.

The lower ring assembly surrounding enclosure 24 is located below housing 16 and connected to main ring 109 through links 29 in a similar manner as links 28 connect the upper ring assembly; link rods 38' operate on rocker arm 39 which is mounted on the bottom of torque shaft 50 in a slot 57.

Two cables 128 and 130 are connected to the rocker arm and run in the interior of torque shaft 50. A corresponding rocker arm 52 is located at the upper end of shaft 50. The cables 128 and 130 are fastened taut through a compression nut arrangement 61 and 62. Rocker arm 52 pivots around pin 63. A block 59 further closes the top of shaft 50 and provides the support for pivoting pin 63. Additional articulated arms 54 are connected to cams 56 which in turn are connected to the upper rotor blades which are pivotably mounted onto shaft 50 through sleeve 58 and retaining screws 57.

In the preferred embodiment depicted in the drawings, operation of the helicopter is done in the following manner.

First the collective pitch control is obtained by a lever not shown which pulls the cable within sleeved cable 90. This action raises collective pitch lever 84 which pivots around hinge 89 and consequently depresses fork 108. This action is transmitted to main pitch control ring 109 through links 82 and as a result, ring 109 slides downward along enclosure 24. This downward motion, devoid of any tilting is transmitted through the three sets of linking rods 28 to the upper ring assembly imparting an increase in the pitch of the lower rotor through links 38. Since the upper ring is simply moved along the axis of enclosure 18, both rotor blades change in pitch by the same amount.

Similarly, the lower ring assembly is pushed downwardly along enclosure 24 by an equal amount. This downward motion through cables 128 and 130 pulls rocker arm 52 straight down by an equal distance and this action is transmitted through cams 54 and 56 to the upper rotor blades, altering their pitch in the same direction as in the lower rotor, and by the same amount. Thus collective pitch control is achieved and the helicopter rises.

Power is transmitted in a conventional manner through the differential gear system to the two rotors through the torque transmitting shafts 50 and 114. The links 38 and associated cams as well as the rocker arm 39 and associated links 38' are free to rotate with the torque transmitting shafts because they are attached to the outer sleeve of bearings. The inner sleeve and ring attached thereto remains stationary because of the presence of the splines which inhibit any rotational movement.

To implement yaw control as well as steering the pitch of the blades of the two rotors must be changed in opposite direction so as to make one of the rotors more efficient and the other less efficient and thus unbalance the net rotational effect from the two counterrotating rotors and consequently turn the helicopter cabin in the desired direction. This is obtained by twisting the handle 94 right or left thus through rod 105 acting on stubs 111 and thus turning all 3 shafts 113 simultaneously in the same rotational direction. At that point the main pitch control ring 109 remains horizontal, or at whatever angle it may have been through the action of other controls.

The shaft 113 rotation causes the link rods 28 to move in one direction, while the link rods 29 move in the opposite direction. This action is transferred to the upper and lower assemblies which move in opposite directions. Since the up or down displacement of the upper and lower ring assemblies results in an increase or decrease of rotor blade pitch, the pitch of the blades of one rotor is increased, and the pitch of the blades of the other is decreased, thus the efficiency of the two rotors is unbalanced and yaw control or steering achieved.

Cyclic pitch control is obtained through lever 92 which is connected directly to main ring 109. As pointed earlier, this main ring may be not only moved along the torque shafts' axis, but can be tilted in all directions, providing a joy stick motion to lever 92. As the lever is tilted to the right for instance, one side of the main ring is raised and the opposite lowered. The same motion is transferred to the upper and lower ring assemblies. This tilting changes the pitch of one blade of the rotor in the opposite direction than the other, through the connecting cams and rocker arms or links and creates an unbalance in the blade efficiency, thus tilting the helicopter in the desired direction. When the nose of the helicopter is tilted downward, of course, the rotors produce not only lift but thrust and forward travel is achieved.

It is to be understood that the above description is illustrative only and that other equivalent means to obtain the same result may be substituted without altering the scope of my invention. One could, for instance, replace the splines along enclosures 18 and 24 by a scissors rotation arresting device, common in aviation equipment. Similarly clutch arrangements may be added to isolate the engine from the rotors, or rods used to replace the cables. Steering pedals or a steering wheel may be employed to control cable 100 and so on. Even though less efficient, yaw pitch control may be limited to pitch control of the blades in one rotor only.

Having thus described the present invention, I claim:

1. A rotor blade pitch control for a coaxial helicopter comprising:
    coaxial counterrotating first and second rotors having adjustable pitch blades, first and second coaxial counterrotating torque transmitting shafts having an axis connected to said first and second rotors respectively,
    a coaxial enclosure surrounding said torque transmitting shafts extending partially along said shafts fixedly mounted with respect to said helicopter, upper and lower pitch control ring assemblies slideably mounted on said enclosure each comprising a non-rotating inner ring surrounding said enclosure and an outer ring rotatably mounted on the inner ring, said upper and lower ring assemblies spaced from each other along said enclosure,
    a non-rotating main pitch control ring also surrounding said enclosure slideably and tiltably mounted thereon,
    mounting means supporting said main pitch control ring at a point intermediate of said upper and lower ring assemblies
    at least two shafts extending radially from the main pitch control ring, mounted rotatably around their axis on the perimeter on the main pitch control ring,
    an elongated plate mounted at the end of each shaft perpendicular thereto, a pair of link rods pivotably mounted on each of the elongated plates on either side of the shaft, each of said rods connecting the non-rotating inner ring of the upper and lower ring assemblies respectively to the main pitch control ring;
    a stub extending from said shaft whereby pulling or pushing on said stub rotates said shaft around its axis and displaces the link rods in each pair and the upper and lower ring assemblies in opposite directions and,
    cam assemblies connected to said outer rings of the upper and lower ring assemblies and to said upper and lower rotor blades respectively for continuously adjusting the rotor blades pitch as a function of the position and angle of the upper and lower pitch control ring assemblies relative to said enclosure.

2. A rotor blade control in accordance with claim 1 in which the mounting means supporting the main pitch control ring comprise:
    a first lever pivotably mounted at a point intermediate its two ends on a support fixedly connected to the enclosure, said first lever also connected at one end through articulated connecting means to the main pitch control ring for supporting and axially displacing the main pitch control ring along said enclosure.

3. A rotor blade control in accordance with claim 2 further comprising a second lever fixedly mounted on and extending radially from said main pitch control ring for tilting said main pitch control ring with respect to said enclosure.

4. A rotor blade control in accordance with claim 3 in which said second lever further comprises a first rod having an upper and a lower end rotatably mounted on said second lever at a point intermediate of said upper and lower ends, a second rod attached at its mid-point perpendicular to the axis of the first rod at the lower end and connecting means extending from the ends of said second rod to said stubs on the radially extending shafts on the main pitch control ring for rotating said shafts.

5. A rotor blade control according to claim 4 wherein three shafts are used, each shaft being located at 90°, 180° and 270° respectively measured with respect to said second lever on said main pitch control ring.

6. A rotor blade control according to any of claims 1, 2, 3, 4 or 5 wherein the inner perimeter of said inner rings and main pitch control ring is a beveled edge abutting against the enclosure.

7. A rotor blade control according to claim 6 comprising means connected between said enclosure and said upper and lower ring assemblies to prevent rotation of the inner ring.

* * * * *